United States Patent
Hanks (10) Patent No.: US 11,311,125 B2
(45) Date of Patent: Apr. 26, 2022

(54) APPARATUS FOR SPREADING BUTTER SUBSTANCE AND METHOD THEREOF

(71) Applicant: North Atlantic Imports, LLC, Logan, UT (US)

(72) Inventor: Christopher L. Hanks, Logan, UT (US)

(73) Assignee: North Atlantic Imports, LLC, Logan, UT (US)

(*) Notice: Subject to any disclaimer, the term of this patent is extended or adjusted under 35 U.S.C. 154(b) by 0 days.

(21) Appl. No.: 16/588,102

(22) Filed: Sep. 30, 2019

(65) Prior Publication Data

US 2020/0107660 A1    Apr. 9, 2020

Related U.S. Application Data

(60) Provisional application No. 62/740,932, filed on Oct. 3, 2018.

(51) Int. Cl.
| | |
|---|---|
| *A47G 21/00* | (2006.01) |
| *B05C 17/02* | (2006.01) |
| *A47G 19/26* | (2006.01) |
| *A47J 43/00* | (2006.01) |
| *B05C 17/035* | (2006.01) |

(52) U.S. Cl.
CPC .......... *A47G 21/005* (2013.01); *A47G 19/26* (2013.01); *A47J 43/00* (2013.01); *B05C 17/0217* (2013.01); *B05C 17/0357* (2013.01)

(58) Field of Classification Search
CPC .. A47G 21/005; A47G 19/26; B05C 17/0217; B05C 17/03; B05C 17/035; B05C 17/0357; A47J 9/001; A47J 43/00; A47J 43/28; B65D 7/34; A21C 15/002

USPC .................................. 401/12, 21, 197, 208
See application file for complete search history.

(56) References Cited

U.S. PATENT DOCUMENTS

| | | | | |
|---|---|---|---|---|
| 1,979,436 | A * | 11/1934 | Bedford | A21C 15/002 118/13 |
| 2,072,663 | A * | 3/1937 | Bedford | A21C 15/002 118/13 |
| 2,336,073 | A * | 12/1943 | Cloutier | A63D 5/00 473/59 |
| 2,548,653 | A * | 4/1951 | Cromwell | B05C 17/0357 401/8 |
| 2,808,020 | A * | 10/1957 | Arvidson | A47G 19/303 118/13 |
| 2,887,707 | A * | 5/1959 | Heintzelman | B05C 17/0357 401/191 |

(Continued)

FOREIGN PATENT DOCUMENTS

GB    1143387    *    2/1969    ............ A47J 47/02

*Primary Examiner* — J C Jacyna
(74) *Attorney, Agent, or Firm* — David L. Stott (57) ABSTRACT

A roller spreading device for spreading a butter substance over a food product is provided. The device includes a basin structure and a roller member. The basin structure is sized to hold the butter substance for melting therein, the basin structure including a lower floor surface extending with an arcuate structure. The roller member includes a cylindrical outer surface with multiple recesses therein sized to capture the butter substance along the multiple recesses. The roller member, suspended within the basin structure, rotates about an axis such that the roller member rotates through the butter substance pooled along the arcuate structure.

15 Claims, 7 Drawing Sheets

(56) References Cited

U.S. PATENT DOCUMENTS

| | | | | |
|---|---|---|---|---|
| 3,115,659 | A | * | 12/1963 | Church ............... B05C 17/0357 15/230.11 |
| 3,263,265 | A | * | 8/1966 | Judson ..................... A21B 3/00 401/269 |
| 3,605,684 | A | * | 9/1971 | McGinley ................ B26D 7/34 118/13 |
| 3,739,743 | A | | 6/1973 | McKee, Jr. |
| 3,817,206 | A | | 6/1974 | Case |
| 3,877,823 | A | * | 4/1975 | Leland ................ B05C 17/0217 401/197 |
| 4,008,681 | A | * | 2/1977 | Johnson ................... B26D 7/34 118/666 |
| 4,029,046 | A | * | 6/1977 | Hertel .................... B05C 1/025 118/202 |
| D257,117 | S | * | 9/1980 | Steiner ........................... D7/670 |
| 4,301,762 | A | | 11/1981 | Burnett, Jr. |
| 4,676,186 | A | * | 6/1987 | Drainas ................ A21C 15/005 118/13 |
| 6,290,412 | B1 | | 9/2001 | Birmingham |
| 6,877,925 | B2 | * | 4/2005 | Fernandez .............. B05C 17/02 401/197 |
| 9,084,499 | B2 | | 7/2015 | Papavero et al. |
| 9,504,346 | B2 | | 11/2016 | Sorsavirta et al. |
| 2009/0148571 | A1 | | 6/2009 | Reda |
| 2012/0282199 | A1 | * | 11/2012 | Pollack .................... A61K 8/37 424/60 |

* cited by examiner

APPARATUS FOR SPREADING BUTTER SUBSTANCE AND METHOD THEREOF

CROSS-REFERENCE TO RELATED APPLICATIONS

This application claims the benefit of U.S. Provisional Application No. 62/740,932, filed Oct. 3, 2018, the disclosure of which is hereby incorporated by reference herein it its entirety.

TECHNICAL FIELD

The present invention relates generally to food preparation devices and, more specifically, the present invention relates to devices for melting and/or spreading butter or the like over a food surface.

BACKGROUND

The spreading of butter or margarine on bread or toast has long been accomplished by using a knife to manually spread the butter or margarine over the surface of the bread or toast. However, the use of a knife to spread butter is a time consuming process which undesirably lengthens the time necessary for food preparation. This is particularly true in the restaurant setting where food preparation time must be maintained at a minimum. Further, it is desirable to melt the butter or margarine before it is applied to the food such that the butter spreads evenly. Moreover, in the case of toast or other foods which should be served warm, warming the butter before it is applied to the food surface helps maintain the proper serving temperature. However, the spreading of butter or margarine is made all the more difficult where the butter or margarine is in a melted state. Further, the prior art devices addressing the above-noted problems, such as that disclosed in U.S. Pat. No. 4,676,186 to Drainas, each exhibit similar structure that require large quantities of butter for the prior art devices to appropriately operate. Therefore, it would be advantageous to be more efficient with the butter needed while also effectively spreading butter to bread and toast.

BRIEF SUMMARY OF THE INVENTION

The present invention is directed to various embodiments of a roller spreading device for spreading a butter substance over a food product. The roller spreading device includes a a base member and a roller member. The base member is sized and configured to hold the butter substance for melting therein. The base member extends with an internal surface defining a first upstanding wall positioned opposite of a second upstanding wall, the first upstanding wall having a first axle mount and the second upstanding wall having a second axle mount such that the first and second axle mounts are in alignment. The internal surface defines a lower floor surface extending between the first and second upstanding walls such that the lower floor surface extends with an arcuate structure. The roller member includes an outer surface extending radially relative to an axis defined by the roller member. Further, the roller member includes ends of an axle, the axle extending along at least a portion of the axis of the roller member. The ends of the axle are positioned at the first and second axles mounts so as to suspend the roller member within the base member so that the outer surface of the roller member rotates adjacently alongside the arcuate structure of the lower floor surface.

In one embodiment, the arcuate structure of the lower floor surface extends radially relative to the axis of the roller member. In another embodiment, the arcuate structure of the lower floor surface extends with a constant radius relative to the axis of the roller member between the first and second upstanding walls of the base member.

In another embodiment, the base member includes a front wall and a rear wall each extending upward from ends of the arcuate structure of the lower floor surface and between the first and second upstanding walls. In a further embodiment, the front wall extends from the arcuate structure in a divergent manner relative to the rear wall.

In another embodiment, the outer surface of the roller member includes multiple recesses defined therein. In still another embodiment, the base member includes at least two base legs extending from an external surface of the base member. In another embodiment, the internal surface of the base member extends to define a notch therein along an upper portion of the base member, the notch sized and configured to facilitate pouring the un-used butter substance from the base member.

In accordance with another embodiment of the present invention, a roller spreading device for spreading a butter substance over a food product is provided. The roller spreading device includes a base member and a roller member. The base member is sized and configured to hold the butter substance for melting therein. The base member includes a lower floor surface extending between two oppositely positioned upstanding side walls. The oppositely positioned upstanding side walls includes axle mounts aligned along an upper portion of the upstanding side walls so as to define an axis such that the lower floor surface extends radially relative to the axis. The roller member includes a cylindrical outer surface such that the cylindrical outer surface defines multiple recesses therein sized and configured to capture the butter substance along the multiple recesses. The roller member includes an axle with ends configured to cooperate with the axle mounts of the base member so that the axle extends along the axis defined by the axle mounts. With this arrangement, the roller member, suspended within the base member at the axle ends, is configured to rotate through the butter substance disposed within the radially extending lower floor surface.

In one embodiment, the radially extending lower floor surface extends with a constant radius relative to the axis. In a further embodiment, the radially extending lower floor surface extends radially upward from a lower most portion toward a front wall surface and toward a rear wall surface, the front wall surface and the rear wall surface extends between the oppositely positioned upstanding side walls.

In another embodiment, the base member includes a front wall and a rear wall each extending upward from the radially extending lower floor surface. In a further embodiment, the front wall extends upward in a divergent manner relative to the rear wall.

In another embodiment, the multiple recesses defined in the cylindrical outer surface of the roller member extend as through holes defined in the roller member. In another embodiment, the base member includes at least two base legs extending from an external surface of the base member. In another embodiment, the base member extends with a basin structure defined by an internal surface, the internal surface defining a notch therein along an upper portion of the base member, the notch sized and configured to facilitate pouring the un-used butter substance from the base member.

In accordance with another embodiment of the present invention, a roller spreading device for spreading a butter substance over a food product is provided. The roller spreading device includes a base member and a roller member. The base member is sized and configured to hold the butter substance for melting therein. The base member includes an internal surface defining oppositely positioned first and second side surfaces, a front surface and a rear surface, the front and rear surfaces extending between the first and second side surfaces. The front and rear surfaces extend downward to an arcuate lower surface. The first and second side surfaces define first and second axle mounts positioned along an upper portion of the oppositely positioned first and second side surfaces. The first and second axle mounts are positioned and aligned to define an axis such that the arcuate lower surface extends radially relative to the axis. The roller member includes a cylindrical outer surface, the cylindrical outer surface defining multiple recesses therein. The roller member includes first and second axle ends sized and configured to cooperate with the respective first and second axle mounts of the base member so as to suspend the roller member within the base member. With this arrangement, the roller member is sized to rotate so that the cylindrical outer surface rotates along the arcuate lower surface of the base member such that the cylindrical outer surface rotates through the butter substance.

In one embodiment, the arcuate lower surface extends with a constant radius relative to the axis of the roller member between the first and second side surfaces. In another embodiment, the arcuate lower surface extends radially upward from a lower most portion of the arcuate lower surface toward the front surface and toward the rear surface of the base member, the front surface and the rear surface extending between the oppositely positioned first and second side surfaces.

In another embodiment, the front surface and the rear surface each extend upward from ends of the arcuate lower surface and between the first and second side surfaces. In a further embodiment, the front surface extends from the arcuate lower surface in a divergent manner relative to the rear surface.

In another embodiment, the multiple recesses defined in the cylindrical outer surface of the roller member extend as through holes defined in the roller member. In another embodiment, the base member includes at least two base legs extending from an external surface of the base member. In another embodiment, the internal surface of the base member extends to define a notch therein along the upper portion of the base member, the notch sized and configured to facilitate pouring the un-used butter substance from the base member.

In accordance with another embodiment of the present invention, a method of spreading a butter substance on a food product is provided. The method includes the steps of: melting the butter substance within a basin structure such that the butter substance sits within a lower arcuate floor surface of the basin structure, the lower arcuate floor surface extending between first and second upstanding side surfaces of the basin structure and extending upward from a lower most portion of the lower arcuate floor surface toward a front surface and a rear surface of the basin structure; and rotating a roller member having a cylindrical outer surface with multiple recesses defined therein through the butter substance within the lower arcuate floor surface such that the roller member rotates about an axis defined by the roller member so that the roller member rotates adjacent the lower arcuate floor surface, the lower arcuate floor surface extending radially relative to the axis.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
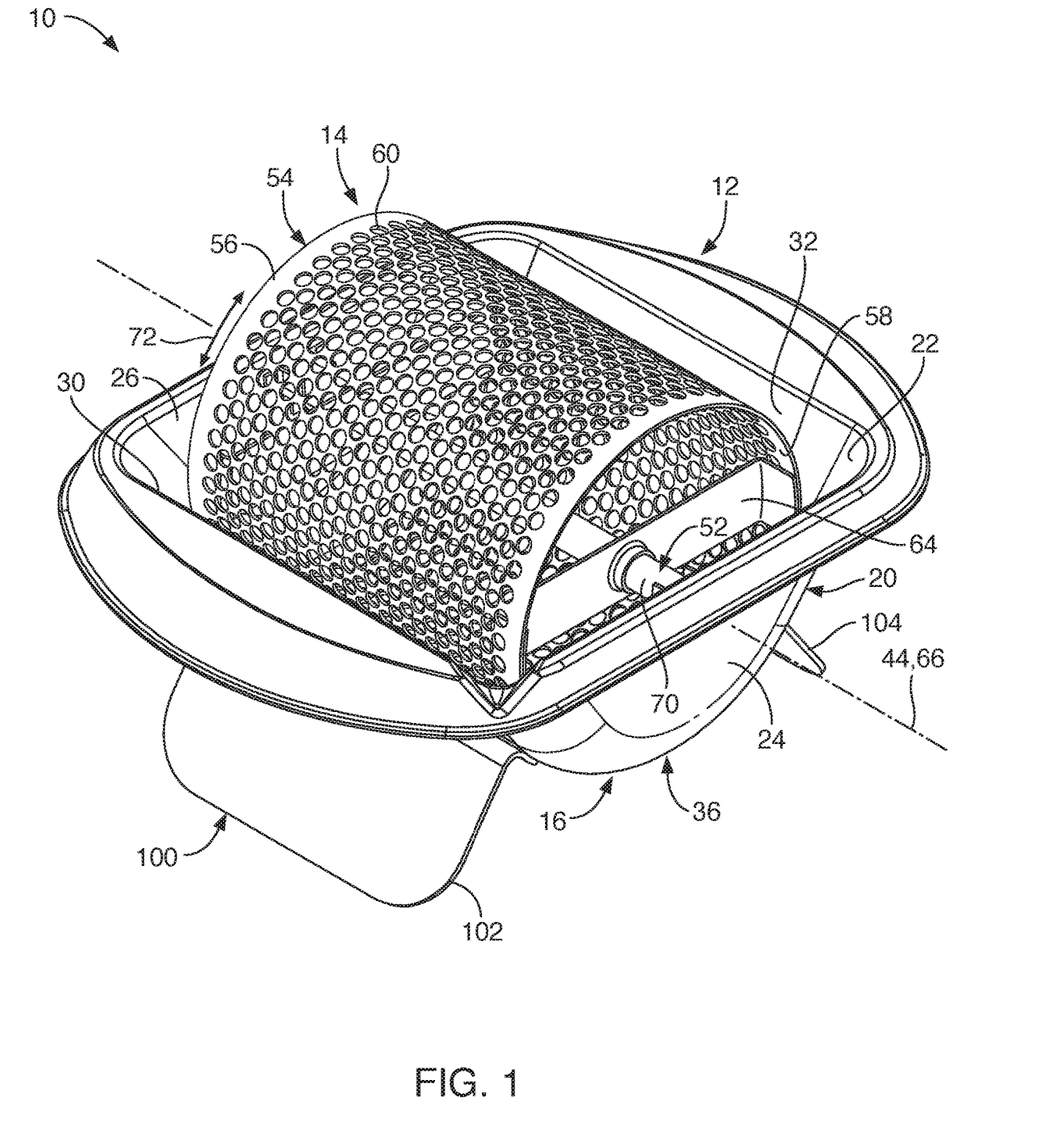
FIG. 1 is a perspective view of a roller spreading device, according to an embodiment of the present invention.
Figure 2:
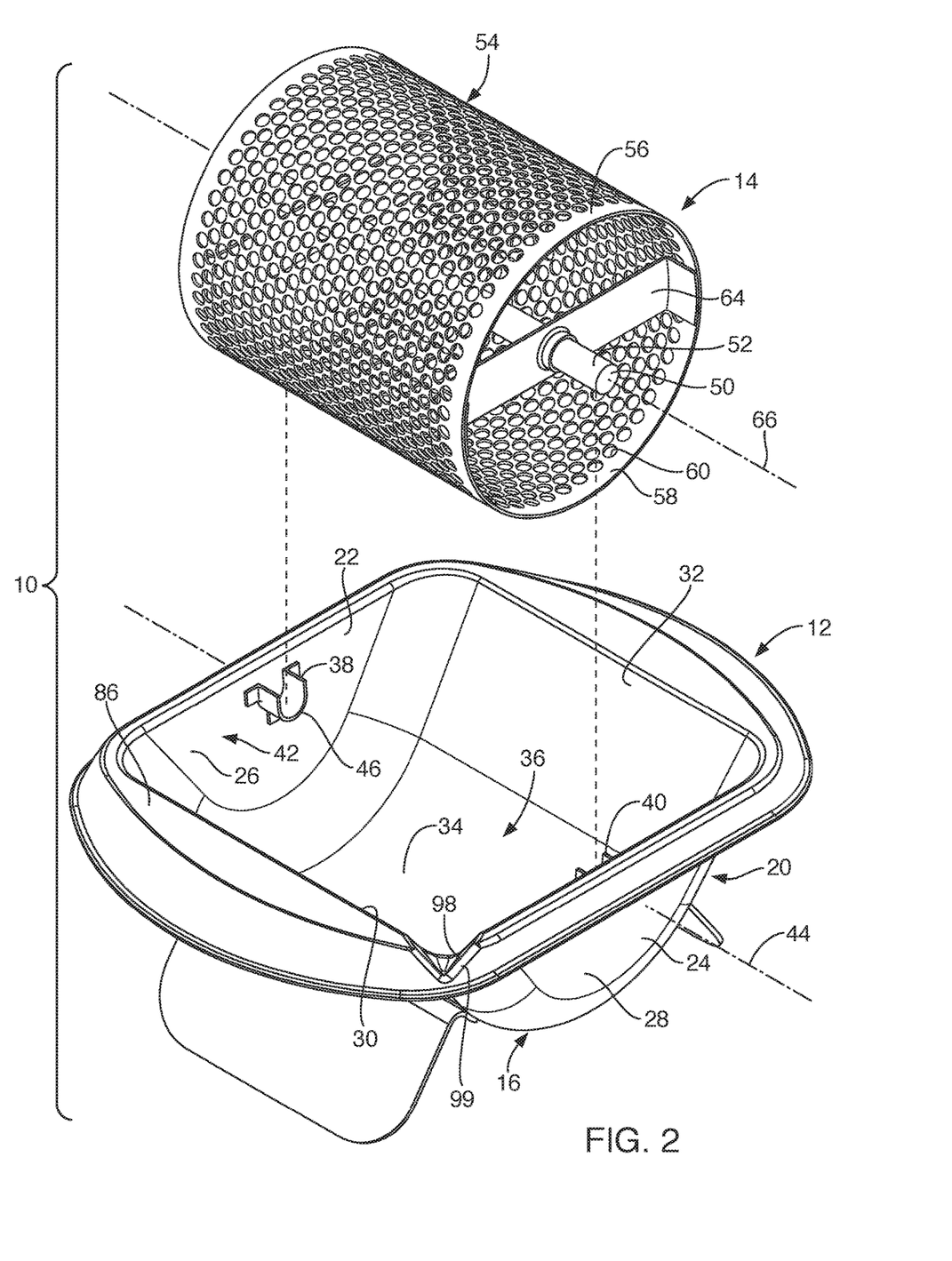
FIG. 2 is an exploded view of the roller spreading device, depicting a roller member disposed above axle mounts of a base member of the roller spreading device, according to another embodiment of the present invention.

Referring to FIGS. 1 and 2, a roller spreading device 10 sized and configured to facilitate spreading or applying a melted butter substance 5 (FIG. 3A) over a food product, such as bread or toast or any other suitable food product, is provided. The butter substance that may be employed with the roller spreading device 10 may be any butter substance, such as butter, margarine or any other suitable food spread.

The roller spreading device 10 or assembly may include two primary components, a base member 12 and a roller member 14. The base member 12 may be formed of a metallic material that may be positioned over, for example, a cooking surface, such as a griddle member or a burner such that heat may conduct through the base member and melt the butter substance. Upon melting the butter substance, the melted butter substance sits within a lower region 16 of the base member 12 so that the roller member 14 may rotate through the melted butter substance to pull the butter substance upward so that a user may spread or daub ones food product in the butter substance that may be lifted or pulled over the roller member 14. In one aspect or embodiment, the base member 12 extends with a basin structure 20 so that the lower region 16 of the basin structure 20 pools a minimal volume of butter substance over an enlarged extended surface area to, thereby, minimize the amount of butter needed for effectively rotating the roller member 14 through the butter substance.

As set forth, the base member 12 may be in the form of a basin structure 20. Such basin structure 20 may also be similar to tray or pan like structural characteristics having an open top side such that the base member 12 may act as a dish or container to hold a liquid therein. The basin structure 20 may extend with an internal surface 22 and an external surface 24 to define a first upstanding side wall 26 and an oppositely positioned second upstanding side wall 28. Further, the basin structure 20 may also include a front wall 30 and an oppositely positioned rear wall 32, the front and rear walls 30, 32 extending between the first and second upstanding side walls 26, 28. The base member 12 may also include a floor surface 34 extending with an arcuate structure 36 such that the arcuate structure 36 may extend with a curve or radius toward the front and rear walls 30, 32. Such arcuate structure 36 may extend to correspond with the roller member 14 so that the butter substance may pool therealong to maximize cooperation between the roller member 14 and a majority of the butter substance pooled in the base member 12.

Figure 3:
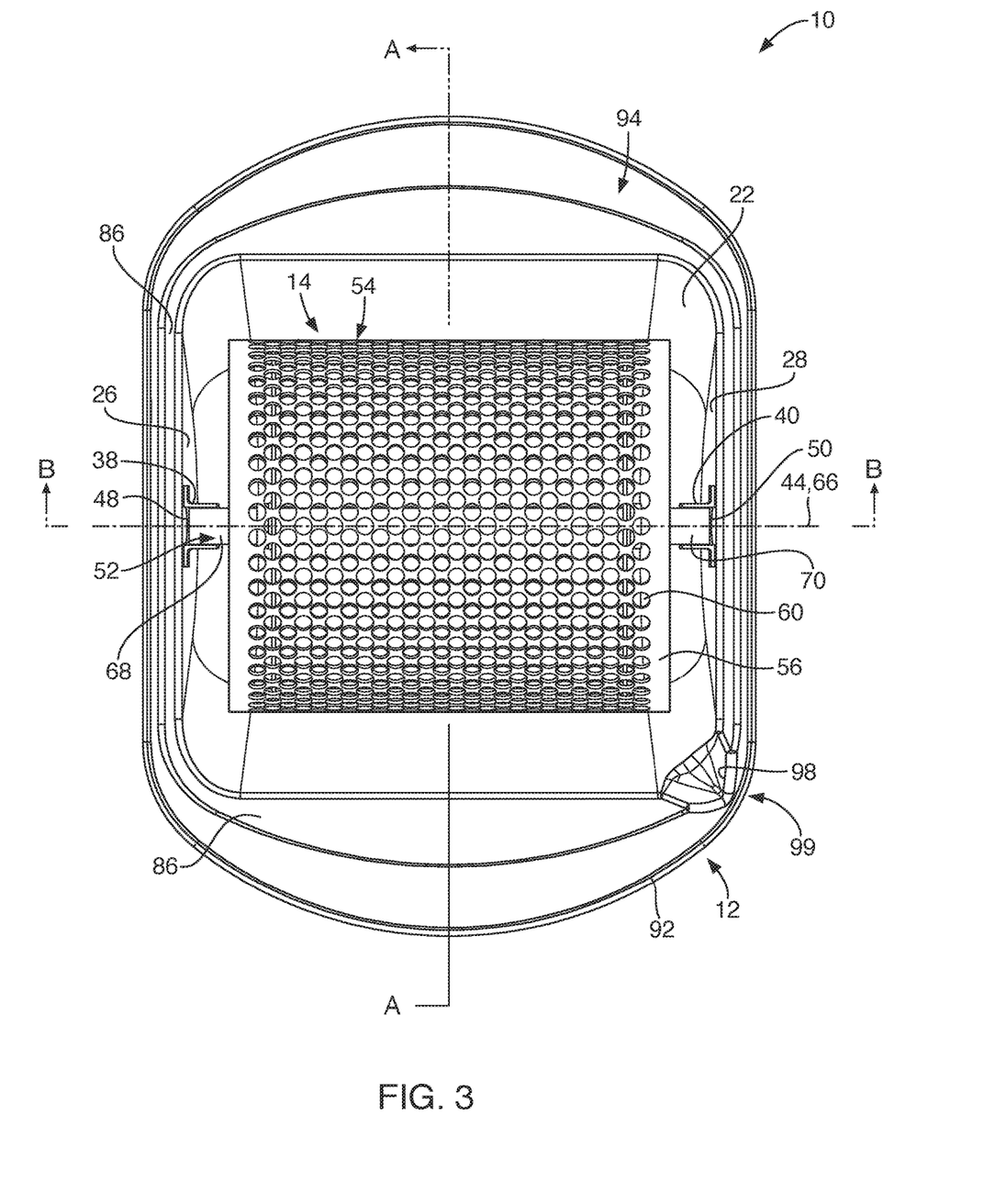
FIG. 3 is a top view of the roller spreading device, according to another embodiment of the present invention.

With reference to FIGS. 1-3, the first and second upstanding side walls 26, 28 may sit vertically with curved portions adjacent the arcuate structure 36 or the side walls 26, 28 may extend at an upstanding angle, similar to that depicted. Further, the first and second upstanding side walls 26, 28 may include a first axle mount 38 and a second axle mount 40, respectively. The first and second axle mounts 38, 40 may be positioned at an upper portion 42 of the first and second side walls 26, 28 and positioned on the internal surface 22 of the first and second side walls 26, 28. The first and second axle mounts 38, 40 may be aligned relative to each other so as to define an axis 44 between the first and second axle mounts 38, 40. Further, the first and second axle mounts 38, 40 may define a rounded lower ledge 46 sized to correspond with, and receive, first and second ends 48, 50 of an axle 52 of the roller member 14. In one embodiment, the first and second axil mounts 38, 40 may be a separate component than that of the base member 12 such that the first and second axil mounts 38, 40 may be coupled, via welding, to the internal surface 22 of the first and second side walls 26, 28 of the base member 12.

In another embodiment, the first and second mounts 38, 40 may be integrally molded in the first and second side walls 26, 28 of the base member 12 such that the first and second mounts 38, 40 may be a seamless, monolithically formed structure with the base member 12 (not separate components). Such first and second mounts 38, 40 formed as the seamless, monolithic structure may define the rounded lower ledge 46 so as to be sized to correspond with, and receive, the first and second ends 48, 50 of the axle 52 of the roller member 14.

The roller member 14 may include a cylindrical sleeve structure 54 with the before-described axle 52 extending therethrough. The cylindrical sleeve structure 54 may extend to define a cylindrical outer surface 56 and a cylindrical inner surface 58. In one embodiment, the cylindrical outer surface 56 may define multiple recesses 60 defined therein. In another embodiment, the multiple recesses 60 may extend as multiple through holes extending through the cylindrical sleeve structure 54 between the cylindrical outer surface 56 and the cylindrical inner surface 58. In another embodiment, the multiple recesses 60 may include cavity like depressions, such as dimples, in the cylindrical outer surface 56. In another embodiment, the multiple recesses 60 may include both cavity like depressions as well as through holes extending through the cylindrical sleeve structure 54. In another embodiment, the multiple recesses 60 may be defined with protrusions or lips extending from the outer surface 56 of the roller member 14. In another embodiment, the multiple recesses 60 may be generally circular shaped. In another embodiment, the recesses 60 may be defined in an array within the cylindrical sleeve structure 54. In another embodiment, the array of the recesses 60 defined in the cylindrical sleeve structure 54 may be defined in a staggered array type configuration.

In another embodiment, the recesses 60 defined in the cylindrical sleeve structure 54 may define various type shapes. For example, the recesses 60 may be slot or slit shaped. In another embodiment, the slit shaped recesses may be elongated to extend generally parallel with the axle 52 or the slit shaped recesses may be elongated to extend generally radial relative to the axle 52. In another embodiment, the slit shaped recesses may extend both parallel and radially defined in the cylindrical sleeve structure 54. In another embodiment, the slit shaped recesses may extend diagonally within the sleeve structure 54. Other shapes that may be employed for the recesses may include x-shaped slots, wavy slots, square slots or any other suitable shape or combinations thereof.

Figure 3A:
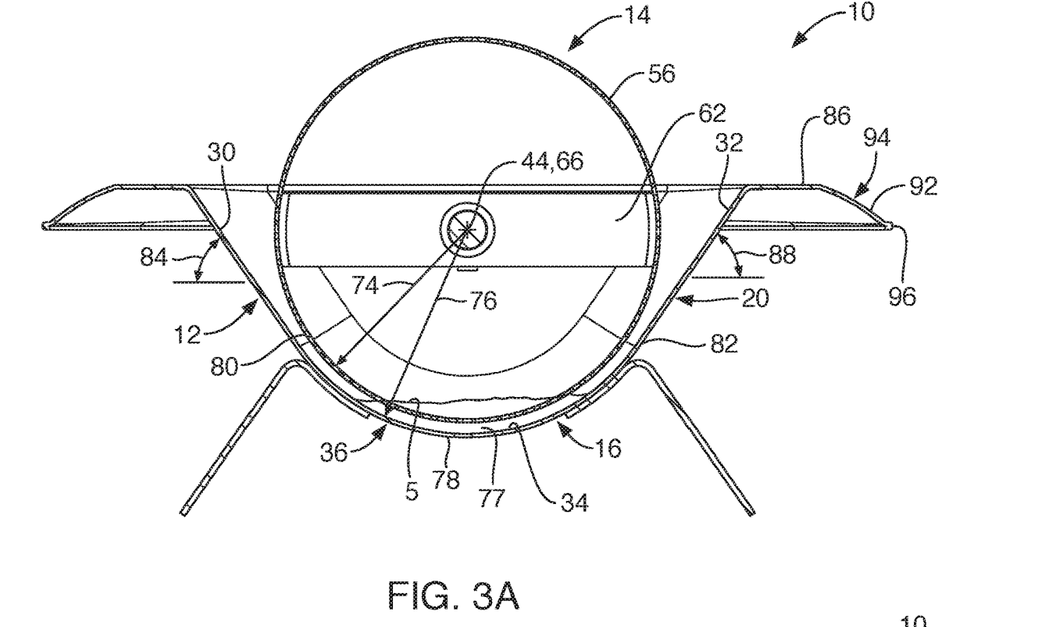
FIG. 3A is a cross-sectional view taken along section A-A of FIG. 3, depicting an arcuate floor surface of the base member, according to another embodiment of the present invention.
Figure 3B:
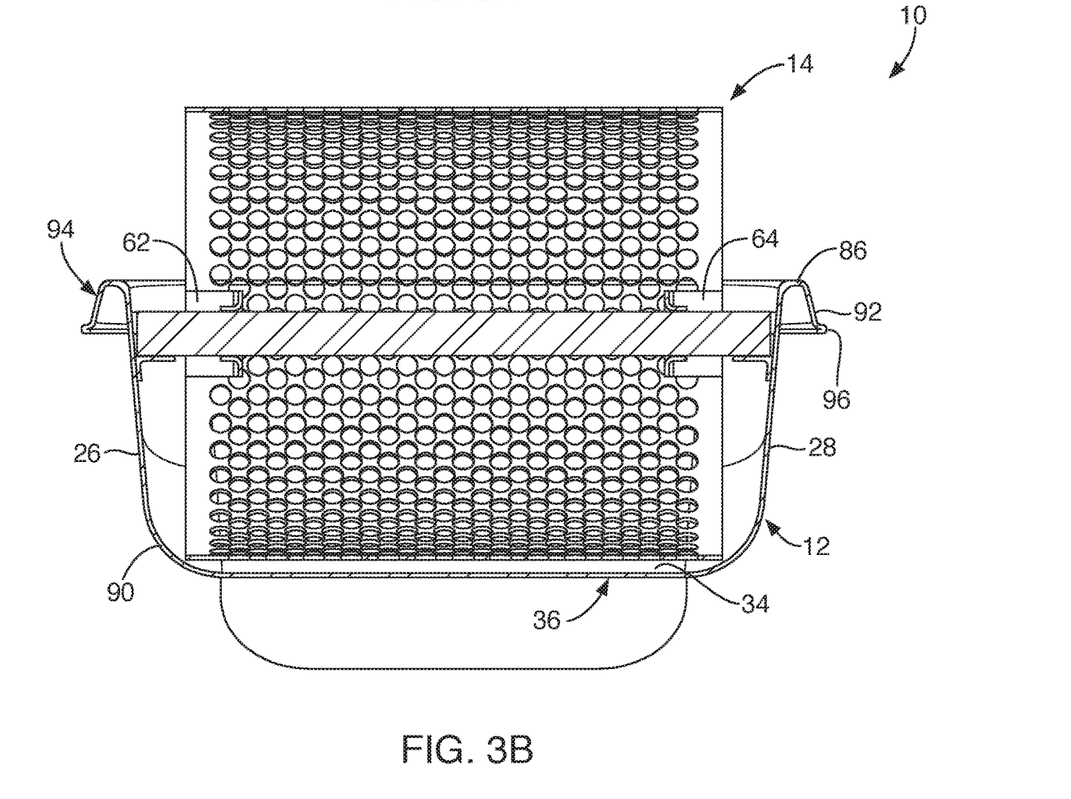
FIG. 3B is a cross-sectional view taken along section B-B of FIG. 3, according to another embodiment of the present invention.

The axle 52 may be fixed to the cylindrical sleeve structure 54 with first and second brackets 62, 64 (see also FIGS. 3A and 3B). Such axle 52 may be an elongated structure and may extend along, and define a roller member axis 66. The first and second brackets 62, 64 may be elongated to extend between opposing sides of the cylindrical inner surface 58 with the axle 52 centrally fixed to the elongated first and second brackets 62, 64. The axle 52 may extend beyond the first and second brackets 62, 64 so as to define first and second end portions 68, 70 of the axle 52. The first and second end portions 68, 70 may sit directly on the first and second axle mounts 38, 40, as depicted in FIGS. 1 and 3. In this manner, the first and second end portions 68, 70 of the axle 52 may cooperate with the first and second axial mounts 38, 40, respectively, to facilitate the roller member 14 to rotate. In another embodiment, the axle 52 may extend with two structural pieces, such as cylindrical end rollers exhibited at the first and second end portions 68, 70 and coupled to the respective first and second brackets 62, 64. As such, in some embodiments, the axle 52 may not extend continuously between the aligned first and second end portions 68, 70.

Further, the roller member 14 may sit on the first and second axle mounts 38, 40 of the base member 12 such that the axis 44 of the first and second axle mounts 38, 40 is co-axial or parallel with the roller member axis 66. The roller member 14 may be positioned to cooperate with the first and second axle mounts 38, 40 so that a user may manually rotate the roller member 14 within the base member 12 so as to rotate from front-to-rear or to rotate from rear-to-front, as indicated by bi-directional rotational arrow 72 (FIG. 1). In this manner, the cylindrical sleeve structure 54 may be suspended within the base member 12 to rotate so that the outer surface of the cylindrical sleeve structure 54 may rotate through liquid, such as the butter substance, in the lower region 16 of the base member 12 (see FIG. 3A).

Now with reference to FIGS. 2 and 3A, as previously set forth, the floor surface 34 may extend with the arcuate structure 36. Such arcuate structure 36 extends so as to facilitate the melted butter substance 5 to pool along the lower region 16 of the basin structure 20. In this manner, such pooling of the butter substance 5 within the lower region 16 of the basin structure 20 allows the butter to pool and spread over an upper surface of the arcuate structure 36 and limits the volume or amount of butter substance 5 needed for the roller member 14 to pass therethrough. In one embodiment, the arcuate structure 36 may extend radially relative to the axis 44 defined by the axle mounts 38, 40 and/or the roller member axis 66. In another embodiment, the arcuate structure 36 may extend radially to correspond with the cylindrical outer surface 56 of the roller member 14. In another embodiment, the arcuate structure 36 may extend radially with a constant radius relative to the axis 44 or roller member axis 66. In another embodiment, the arcuate structure 36 may extend radially with a varying radius length relative to the axis 44 or the roller member axis 66. In another embodiment, the arcuate structure 36 may extend flat along a line between the first and second upstanding side walls 26, 28 (see FIG. 3B). In another embodiment, the roller member 14 defines a roller member radius 74 such that a radius 76 of the arcuate structure 36 may be larger than the roller member radius 74. Each of the roller member radius 74 and the radius 76 of the arcuate structure 36 may be defined relative to the axis 44 of the axle mounts 38, 40 and/or the roller member radius 74. In another embodiment, the outer surface 56 of the roller member 14 may rotate above the arcuate structure 36 so as to define a gap 77 in the lower region 16 of the roller spreading device 10. The gap 77 may be anywhere between about 1 mm to about 7 mm. In another embodiment, the gap 77 may be about 3 mm.

In one embodiment, the arcuate structure 36 may extend radially from a lower most portion 78 to an upper most front portion 80 and an upper most rear portion 82 of the arcuate structure 36. In this manner, the arcuate structure 36 may extend radially upward from the lower most portion 78 toward the front wall 30 and extend radially upward from the lower most portion 78 toward the rear wall 32. At the upper most front portion 82 of the arcuate structure 36, the front wall 30 may continue to extend at a front wall angle 84 to a top portion 86 or the upper portion 42 of the base member 12. Similarly, at the upper most rear portion 82 of the arcuate structure 36, the rear wall 32 may extend at a rear wall angle 88 to the top portion 86 or the upper portion 42 of the base member 12. In another embodiment, the front wall 30 and/or the rear wall 32 may extend relative angles in a flat configuration. In another embodiment, the front and/or rear walls 30, 32 and/or the first and second side walls 26, 28 may extend in a curved manner to define a rounded contour. Such curvature in the front and/or rear walls 30, 32 may extend to minimize the gap 77 along the front and rear walls 30, 32 similar to that depicted in the lower region 16 of the roller spreading device 10. In another embodiment, the curvature defined in the front and/or rear walls 30, 32 may extend to define a channel that may centrally extend downward within the front and/or rear walls 30, 32 toward the arcuate structure 36 so that butter may be channeled toward the lower region 16 of the basin structure 20.

In another embodiment, the roller member 14 may extend to define, at least partially, a spherical profile. In this embodiment, the arcuate structure 36 may extend with a radius relative to an axis or axle of the spherical profile. In addition, the arcuate structure 36 may extend radially so as to define an axially extending concave feature between the first and second side walls 26, 28. In this manner, the arcuate structure 36 may extend, at least partially or at least along a lower region of the arcuate structure 36 where a butter substance will pool, to correspond with an outer surface of a spherical roller member.

Now with reference to FIGS. 3, 3A and 3B, the roller spreader device with its base member and roller member are depicted in top and cross-sectional views. As depicted in FIG. 3B, the arcuate structure 36 may extend linearly between the first and second upstanding side walls 26, 28. At a transition between the floor surface 34 and the first and second side walls 26, 28, the base member 12 may extend with a radius or with a curved or rounded portion 90. Further, each of the first and second upstanding side walls 26, 28 and front and rear walls 30, 32 may extend upward to the top portion 86 laterally extending with a lip 92. The top portion 86 and lip 92 may extend along a periphery 94 of the upper most portion of each of the first and second side walls 26, 28 and the front and rear walls 30, 32. As depicted in FIG. 3A, along the top portion 86 of the front and rear walls 30, 32, the top portion 86 may extend horizontally outward and then transversely downward at an outward angle to exhibit the lip 92. Further, as depicted in FIG. 3B, along the top portion 86 of the first and second side walls 26, 28, the top portion 86 may extend horizontally (in a narrower manner compared to the top portion 86 along the front and rear walls 30, 32) and may exhibit a tighter curled lip. The lip 92, extending from the front and rear walls 30, 32 as well as the first and second side walls 26, 28, may extend to a lip end 96. Such lip end 96 may extend downward so as to be level about the entire periphery 94 of the base member 12.

Now with reference to FIGS. 2 and 3, the top portion 86 of the base member 12 may define a notch 98 therein. Such notch 98 may be positioned along the periphery 94 and may be sized and configured to facilitate pouring any remaining or un-used butter substance upon completing use of the roller spreading device 10. In one embodiment, the notch 98 may extend with a tapered recess to a point that extends adjacent to or in the periphery 94 of the top portion 86 of the base member 12. In one embodiment, the notch 98 may be positioned adjacent a corner portion 99 of the base member 12. In another embodiment, the notch 98 may be positioned at the corner portion 99 between the front wall 30 and one of the first and second upstanding side walls 26, 28. In another embodiment, the notch 98 may be positioned at the corner portion 99 between the rear wall 32 and one of the first and second upstanding side walls 26, 28.

Figure 4:
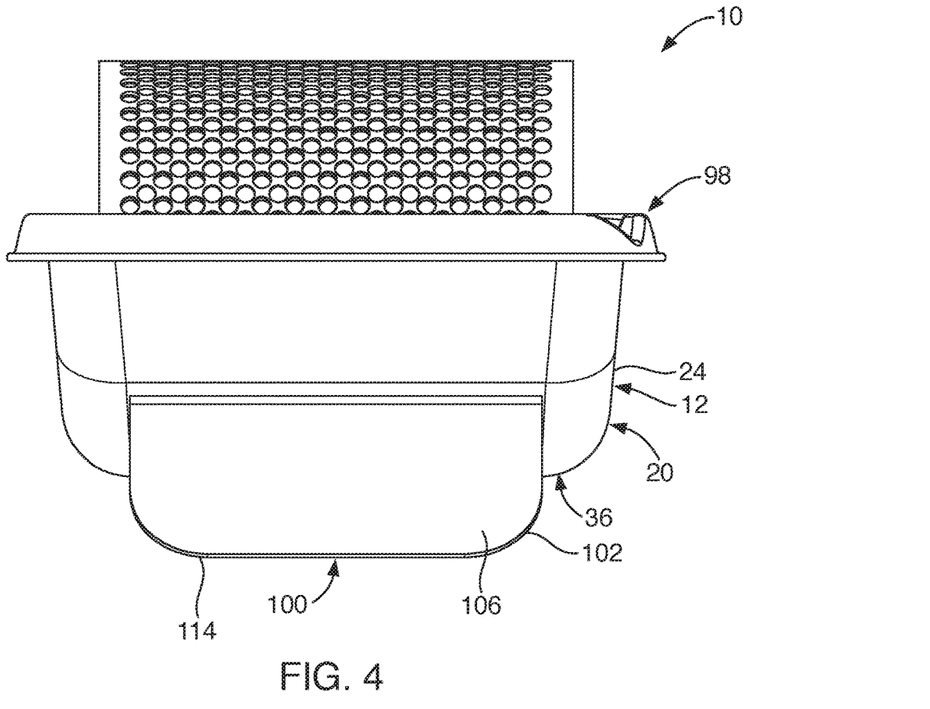
FIG. 4 is a front view of the roller spreading device, according to another embodiment of the present invention.
Figure 7:
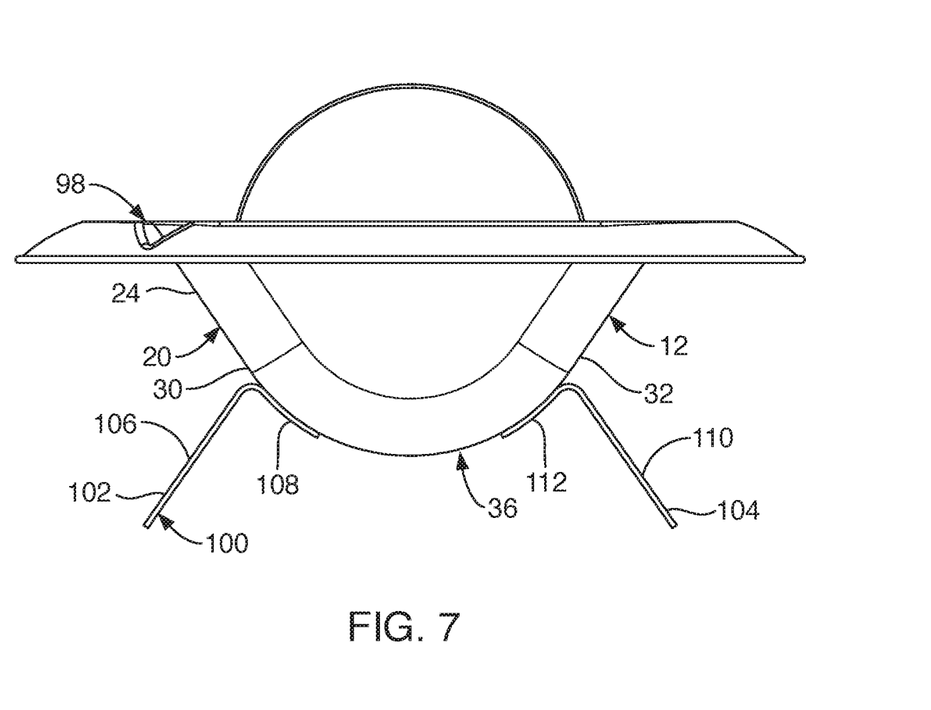
FIG. 7 is a right view of the roller spreading device, according to another embodiment of the present invention.

With reference to FIGS. 1, 4 and 7, the base member 12 may include one or more base legs 100 for suspending the basin structure 20 above the surface that the legs 100 may be positioned upon. For example, in one embodiment, the base member 12 may include a front leg 102 and a rear leg 104. The front leg 102 may extend with a front leg portion 106 and a front fixed portion 108. The front fixed portion 108 may be secured to the external surface 24 of the basin structure 20 along an underside of the arcuate structure 36 or along an underside of the front wall 30. The front fixed portion 108 may extend with a width to a similar extent of the width of the front wall 30. The front leg portion 106 may extend with a similar width downward at an angle so as to extend with a height that extends beyond the underside of the arcuate structure 36. Similarly, the rear leg 104 may extend with a rear leg portion 110 and a rear fixed portion 112. The rear fixed portion 112 may be secured to the external surface 24 of the basin structure 20 along an underside of the arcuate structure 36 or along an underside of the rear wall 32. The rear fixed portion 112 may extend with a width to a similar extent of the width of the rear wall 32. The rear leg portion 110 may extend with a similar width downward at an angle so as to extend with a height that extends beyond the underside of the arcuate structure 36. In this manner, the front leg 102 and the rear leg 104 may extend from the basin structure 20 so that the basin structure 20 may be suspended above a cooking surface or the like for heating the butter substance. In another embodiment, the base member 12 may include at least two legs or more than two legs. Further, in another embodiment, such legs 100 may be shortened or positioned relative to the basin structure 20 in a manner so that a lower most surface of the basin structure 20 may be suspended and may be positioned closer to the cooking surface or a burner for heating the butter substance within the basin structure 20.

Figure 5:
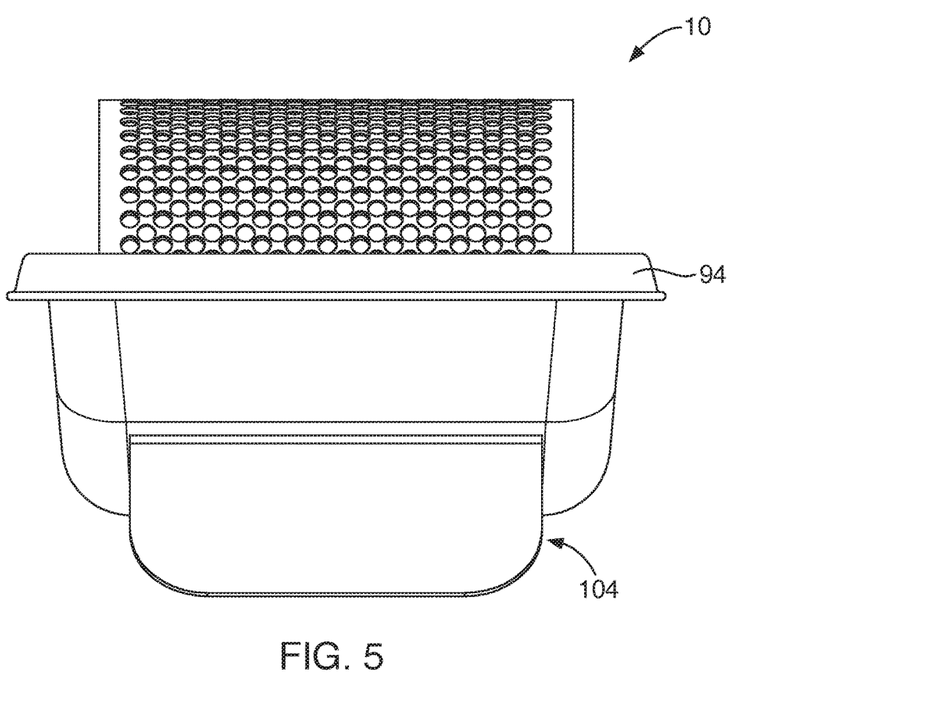
FIG. 5 is a rear view of the roller spreading device, according to another embodiment of the present invention.

With respect to FIGS. 4 and 5, the roller spreading device 10 is depicted in its front and rear view, respectively. As shown in the front view, the notch 98 may be defined in a front-side portion of the periphery 94 and may extend within the periphery 94 as a recess. Further, the front leg 102 may define a front base leg end 114 that may extend linearly along a majority of its length and curve toward side portions of the front leg 102. The rear leg 104 may extend with a similar profile as the front leg.

Figure 6:
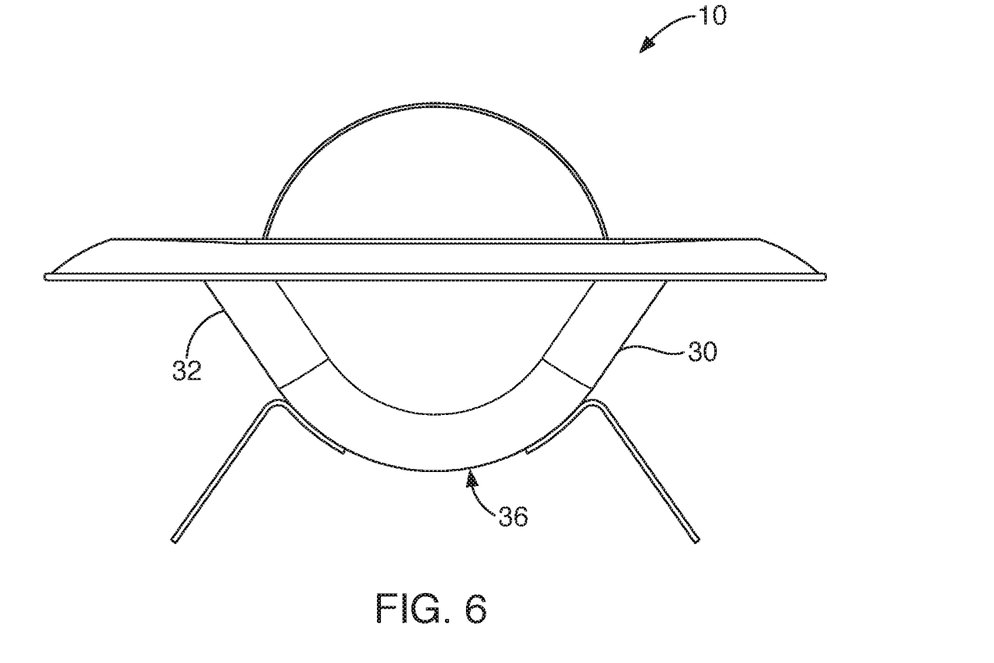
FIG. 6 is a left view of the roller spreading device, according to another embodiment of the present invention.
Figure 8:
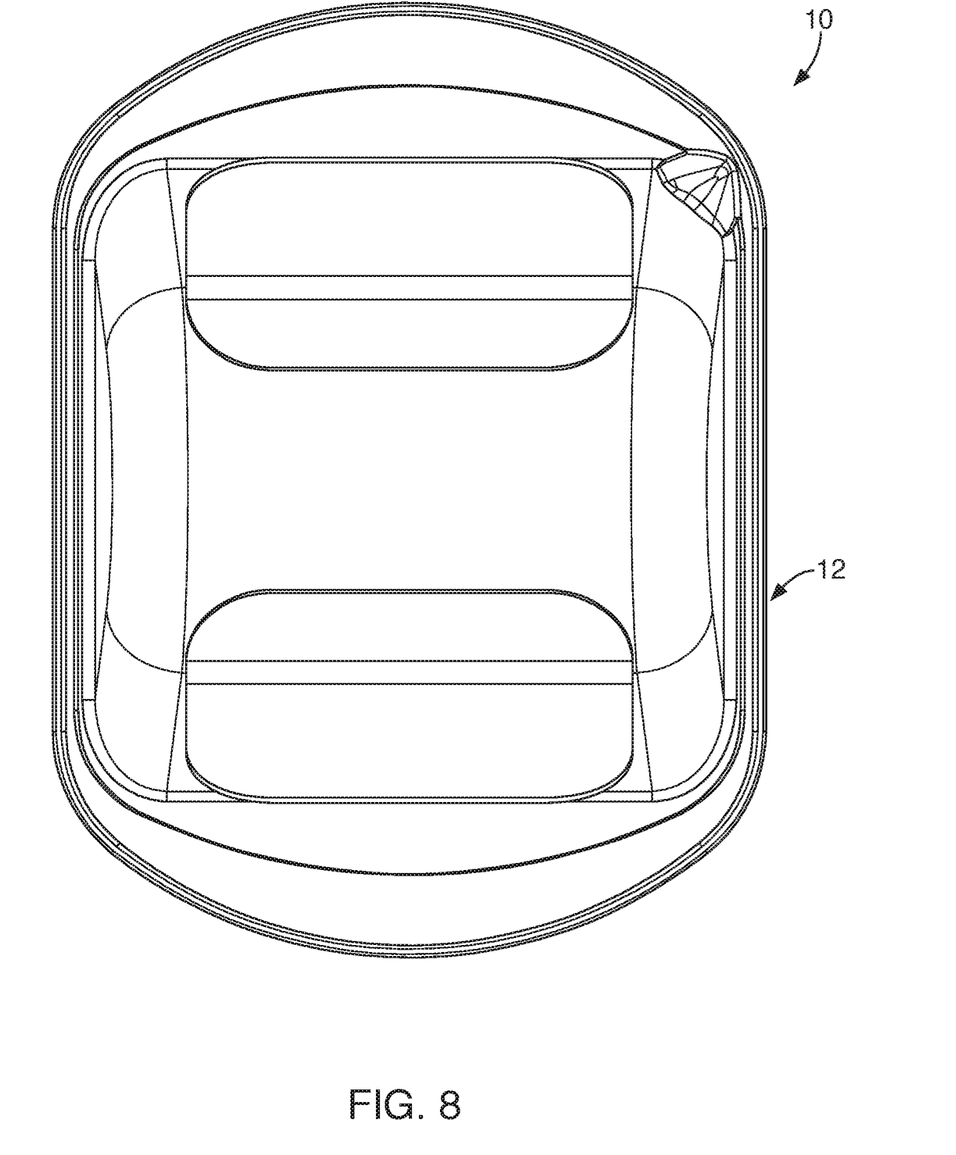
FIG. 8 is a bottom view of the roller spreading device, according to another embodiment of the present invention.

With respect to FIGS. 6 and 7, the roller spreading device 10 is depicted in its left and right side views, respectively. In one embodiment, both left and right side views may be substantially identical, except in the right side view, the notch 98 may be viewable. As depicted, in one embodiment, the front wall 30 and the rear wall 32 may extend from the arcuate structure 36 in a divergent manner. In another embodiment, the front wall 30 may extend relative to the rear wall 32 in a divergent manner. FIG. 8 depicts the bottom view of the roller spreading device 10, depicting an underside of the base member 12.

The various structural components of the roller spreading device 10 including the base member 12 and the roller member 14 may be formed of a metallic material or multiple metallic materials, such as steel, stainless steel, copper, aluminum or any other suitable material that may suitably conduct heat for melting a butter substance. Further, certain portions of the device in, for example, the roller member 14 may include a suitable polymeric material with high temperature ratings. Further, the base member 12 and roller member 14 may be formed from known structural components, such as sheet metal at various gauges/thicknesses or other known metallic structures, such as plate materials, tubing, rods or the like, and may be formed and manufactured through various known processes and techniques known in the art, such as casting, welding, rolling, bending, pressing, fastening, molding, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A roller spreading device for spreading a butter substance over a food product, comprising:
    a base member sized and configured to hold the butter substance for melting therein, the base member extending with an internal surface defining a front wall, a rear wall, a first upstanding wall, and a second upstanding wall, the first upstanding wall positioned opposite of the second upstanding wall, the first upstanding wall having a first axle mount and the second upstanding wall having a second axle mount such that the first and second axle mounts are in alignment and substantially centered along the first and second upstanding walls, the internal surface defining a lower floor surface extending between the first and second upstanding walls, the lower floor surface extending with an arcuate structure so as to extend radially from a lower most portion of the arcuate structure, the arcuate structure extending radially outward and upward with a curvature directly from the lower most portion toward the front wall and the rear wall; and
    a roller member having a wall with an outer surface extending radially relative to an axis defined by the roller member, the wall including multiple holes defined therein such that the holes each extend completely through the wall so that the multiple holes are sized and configured to capture the butter substance therealong, the roller member including ends of an axle, the axle configured to extend along at least a portion of the axis of the roller member, the ends of the axle positioned at the first and second axle mounts so as to suspend the roller member within the base member so that the outer surface of the roller member rotates adjacently alongside the arcuate structure of the lower floor surface;
    wherein the arcuate structure extends radially with the curvature relative to the axis of the roller member and the outer surface of the roller member such that a gap defined between the outer surface of the roller member and the lower surface of the base member is within a range between about 1 mm and about 7 mm.

2. The roller spreading device of claim 1, wherein the arcuate structure of the lower floor surface extends with a constant radius relative to the axis of the roller member between the first and second upstanding walls of the base member.

3. The roller spreading device of claim 1, wherein the front wall and the rear wall each extend upward from ends of the arcuate structure of the lower floor surface and between the first and second upstanding walls.

4. The roller spreading device of claim 3, wherein the front wall extends in a divergent manner relative to the rear wall.

5. The roller spreading device of claim 1, wherein the base member comprises at least two base legs extending from an external surface of the base member.

6. The roller spreading device of claim 1, wherein the internal surface of the base member extends to define a notch therein along an upper portion of the base member, the notch sized and configured to facilitate pouring the un-used butter substance from the base member.

7. A roller spreading device for spreading a butter substance over a food product, comprising:
    a base member sized and configured to hold the butter substance for melting therein, the base member including a lower floor surface extending between a front wall, a rear wall, and two oppositely positioned upstanding side walls, the oppositely positioned upstanding side walls including axle mounts aligned and substantially centered along an upper portion of the upstanding side walls so as to define an axis, the lower floor surface extending radially with a curvature relative to the axis and extends radially outward and upward with the curvature from a lower most portion of the lower floor surface toward the front wall and the rear wall; and
    a roller member extending to define a sleeve structure having a wall with a cylindrical outer surface, the wall defining multiple holes therein such that each of the holes extend completely through the wall, the multiple holes sized and configured to capture the butter substance along the multiple holes, the roller member including an axle with ends configured to cooperate with the axle mounts of the base member so that the axle extends along the axis defined by the axle mounts, the roller member, suspended within the base member at the axle ends, is configured to rotate through the butter substance disposed within the radially extending lower floor surface such that the radially extending lower floor surface curves to correspond with the cylindrical outer surface of the roller member and such that a gap defined between the outer surface of the roller member and the lower surface of the base member is within a range between about 1 mm to about 7 mm.

8. The roller spreading device of claim 7, wherein the radially extending lower floor surface extends with a constant radius relative to the axis.

9. The roller spreading device of claim 7, wherein the front wall and the rear wall extend between the oppositely positioned upstanding side walls.

10. The roller spreading device of claim 7, wherein the front wall and the rear wall each extend upward from the radially extending lower floor surface such that the front wall extends in a divergent manner relative to the rear wall.

11. The roller spreading device of claim 7, wherein the base member comprises at least two base legs extending from an external surface of the base member.

12. The roller spreading device of claim 7, wherein the base member extends with a basin structure defined by an internal surface, the internal surface defining a notch therein along an upper portion of the base member, the notch sized and configured to facilitate pouring the un-used butter substance from the base member.

13. A roller spreading device for spreading a butter substance over a food product, comprising:
a base member sized and configured to hold the butter substance for melting therein, the base member having an internal surface defining oppositely positioned first and second side surfaces, a front surface and a rear surface, the front and rear surfaces extending between the first and second side surfaces, the front and rear surfaces extending downward to an arcuate lower surface, the first and second side surfaces defining first and second axle mounts positioned along an upper portion of the oppositely positioned first and second side surfaces such that the first and second axle mounts are substantially centered along the upper portion of the first and second side surfaces, the first and second axle mounts positioned and aligned to define an axis such that the arcuate lower surface extends radially relative to the axis so as to extend radially from a lower most portion of the arcuate lower surface, the arcuate lower surface extending radially outward and upward with a curvature directly from the lower most portion toward the front wall surface and the rear wall surface; and
a roller member having a wall with a cylindrical outer surface, the wall including multiple holes defined therein such that the holes extend completely through the wall, the roller member including first and second axle ends sized and configured to cooperate with the respective first and second axle mounts of the base member so as to suspend the roller member within the base member, the roller member sized to rotate so that the cylindrical outer surface rotates along the arcuate lower surface of the base member such that the cylindrical outer surface rotates through the butter substance such that the arcuate lower surface extends with the curvature to correspond with the cylindrical outer surface of the roller member and such that a gap defined between the outer surface of the roller member and the lower surface of the base member is within a range between about 1 mm to about 7 mm.

14. The roller spreading device of claim 13, wherein the arcuate lower surface extends with a constant radius relative to the axis of the roller member between the first and second side surfaces.

15. The roller spreading device of claim 13, wherein the front wall extends in a divergent manner relative to the rear wall.

* * * * *